United States Patent [19]

Coppolani

[11] Patent Number: 4,873,105

[45] Date of Patent: Oct. 10, 1989

[54] METHOD FOR THE TREATMENT OF AN ELONGATED ARGICULTURAL PRODUCE

[75] Inventor: Joseph Coppolani, Meudon La Foret, France

[73] Assignee: Femia Industrie, Paris, France

[21] Appl. No.: 210,319

[22] Filed: Jun. 23, 1988

[30] Foreign Application Priority Data

Jun. 25, 1987 [FR] France ................................. 87 8967

[51] Int. Cl.$^4$ .......................... A23P 1/00; B23D 19/00
[52] U.S. Cl. .................................... 426/481; 83/409.1; 99/636; 426/484
[58] Field of Search ................. 426/481, 484; 99/636, 99/638, 644; 83/409.1

[56] References Cited

U.S. PATENT DOCUMENTS

| | | | |
|---|---|---|---|
| 1,256,492 | 2/1918 | Urschel | 83/409.1 |
| 1,351,143 | 8/1920 | Vaudreuil | 83/409.1 |
| 4,528,902 | 6/1985 | Mietzel | 99/636 |

FOREIGN PATENT DOCUMENTS 689495 3/1940 Fed. Rep. of Germany .
121602 5/1966 Fed. Rep. of Germany .

OTHER PUBLICATIONS

French Search Report No. 8708967.

*Primary Examiner*—George Yeung
*Attorney, Agent, or Firm*—Kenyon & Kenyon

[57] ABSTRACT

The present invention concerns a method and a device for the treatment of an elongated agricultural produce, such as vegetables, this device comprising an inner drum coaxial with the treatment drum and rotatably solid with the latter, the inner drum being provided with at least one strip which is wound in an helicoidal manner around its axis like at least one screw thread and with radial walls extending in a parallel direction to the longitudinal axis of the drum while being angularly spaced from one another so as to delimit, with the turns of the helicoidal strip, compartments for receiving and transporting the treated produce.

6 Claims, 2 Drawing Sheets

METHOD FOR THE TREATMENT OF AN ELONGATED ARGICULTURAL PRODUCE

BACKGROUND OF THE INVENTION

The present invention concerns a method for the treatment of an elongated agricultural produce, such as vegetables, as well as a device for carrying out this method.

The method according to the invention finds application in particular in the machines for cutting off the ends of vegetables such as French beans or in vegetable sorting machines for example for French beans.

There has been known a machine for cutting off the ends of French beans, of the type comprising essentially a rotary treatment drum whose longitudinal axis is inclined with respect to a horizontal line in order to obtain the progression of the French beans from the upper inlet end to the lower outlet end of the drum. The drum is formed of plaquettes, for example of a special synthetic material, with specially designed slots to provide an optimal cutting off of the ends of French beans during the rotation of the drum with the aid of a system with cutters arranged outside the drum. Due to the rotation of the drum, the French beans are brought continually to the top of the drum and fall towards the present bottom of the drum. However, due to the great height of fall of the French beans and to their impact speed against the present bottom surface in motion of the drum, a deterioration of the French beans occurs, in particular due to the abrasion on the surface in motion of the bottom of the drum.

Such a phenomenon occurs also in the case of a French beans sorting machine.

SUMMARY OF THE INVENTION

The present invention has as an object to eliminate the above drawback of the known machines while retaining the yield thereof.

For this purpose, the invention concerns a method for the treatment of an elongated agricultural produce, such as vegetables, occurring near the surface of the inner lateral wall of a rotary drum whose axis is substantially horizontal or somewhat inclined with respect to an horizontal line, the produce brought continually to the top of the drum due to the rotation thereof, falling towards the present bottom of the drum and consisting in lowering the effective height of fall of the produce to reduce the impact speed thereof while producing the longitudinal progression of the produce inside the drum in a parallel direction to the longitudinal axis of the drum.

According to another feature of the present invention, the method consists in stopping the fall of the produce after a relatively short initial height of fall; in transporting positively the produce along a preferably at least approximately helicoidal path so as not only to make the produce go down but also to move it along the axial direction down to a lower level located at a relatively low height above the present bottom of the drum; and in making it fall once more down to this bottom.

The present invention concerns also a device for carrying out the above-defined method, of the type comprising a cylindrical rotary treatment drum whose axis is substantially horizontal or somewhat inclined and comprising an inner drum coaxial with the said treatment drum and rotatably solid with the latter, the said inner drum being provided with at least one strip wound in an helicoidal manner around its axis like at least one screw thread and with radial walls extending in a parallel direction with the longitudinal axis of the drum while being angularly spaced from one another so as to delimit, with the turns of the helicoidal strip, compartments for receiving and transporting the treated produce.

According to another feature of the device of the present invention, the aforesaid turns of the helicoidal strip may have a selectively varying pitch.

BRIEF DESCRIPTION OF THE DRAWINGS

The present invention will be better understood and other objects, features, details and advantages thereof will appear more clearly as the following explanatory description proceeds with reference to the appended diagrammatic drawings given by way of example only illustrating an embodiment of the invention, and wherein.

DETAILED DESCRIPTION

Figure 1:
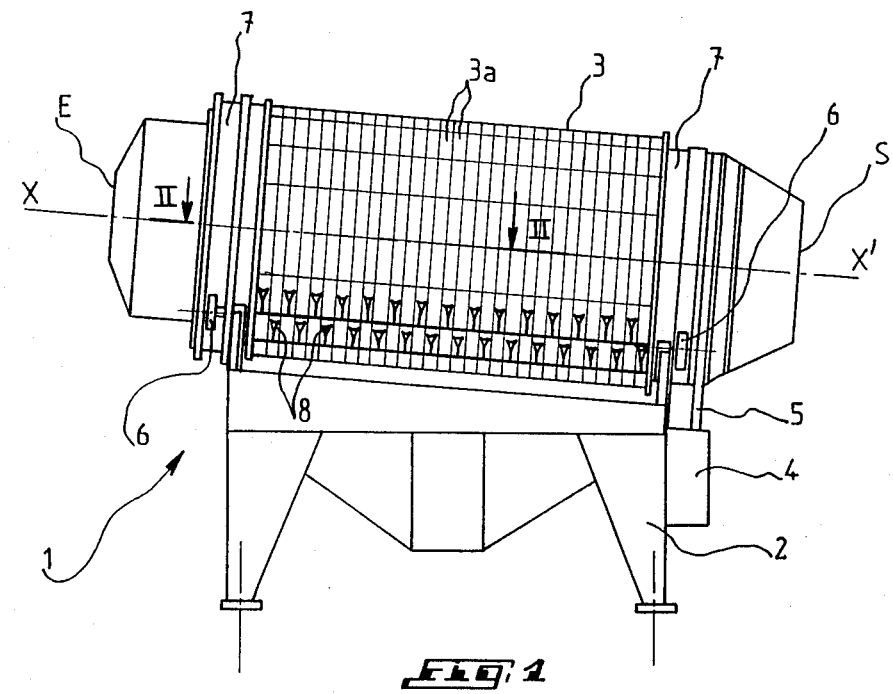
FIG. 1 shows a general view of a machine for cutting off the ends of a produce such as French beans comprising the device according to the present invention.

The invention will be described in the case of a machine for cutting off the ends of French beans designated by the reference sign 1 in FIG. 1.

Such a machine comprises a frame 2 for carrying a cylindrical drum 3 rotatably actuated about its longitudinal axis X—X' by an actuating device formed of an electric motor 4 and of a driving belt 5 mounted in an annular groove formed near one of the ends of drum 3. The drum 3 is rotatably carried through the medium of two opposed pairs of rollers 6 whose rotation axes are solid with the frame 2 and which are in contact respectively with two annular rotational guiding tracks 7 located respectively near the two ends of drum 3. The surface of the lateral wall of the latter is defined by a plurality of plaquettes 3a each comprising slots 3a1 specially designed to provide an optimum cutting off of the ends of the French beans. Annular walls 3b are mounted in a parallel direction to one another inside drum 3 and work as interposed walls for the separation of adjacent plaquettes 3a. The machine comprises also a system with cutters 8 which are for example triangular in shape and which abut against the surface of the outer side wall of drum 3 to ensure the cutting off of the ends of the French beans. The longitudinal axis X-X' of the drum is inclined with respect to an horizontal line to obtain the progression of the French beans inside drum 3 from the inlet end E of the drum to its outlet end S.

As the structure and the operation of such a machine are already known, it is not necessary to describe them more in detail.

Figure 3:
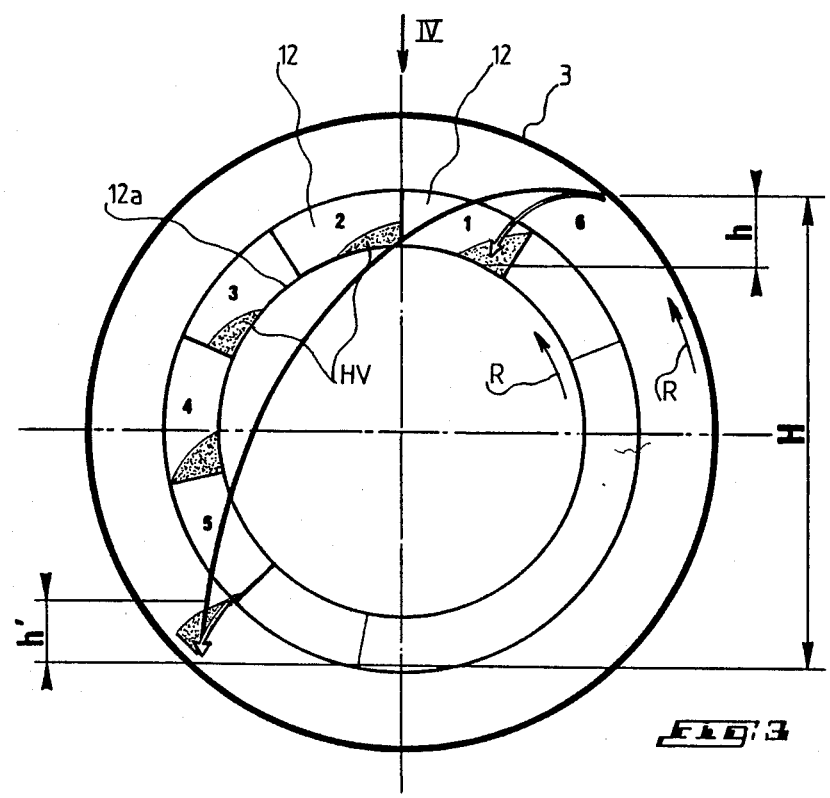
FIG. 3 is a diagrammatic transversal view showing the principle of operation of the device according to the present invention.

However, as shown in FIG. 3, the French beans are brought continually to the vicinity of the top of the drum due to the rotation thereof and fall towards the present bottom of drum 3 along an approximately elliptical path with a height of fall H. Due to the great height of fall H of the French beans on the present bottom surface in motion of the drum, the French beans are subjected to a deterioration in particular due to the abrasion on the bottom in motion.

To eliminate the above drawback, the present invention consists in providing the known above machine with a cylindrical inner drum 9 which is coaxial with the treatment drum 3 and rotatably solid with the latter. The drum 9 is rendered solid with the drum 3 for example by means of a cradle with three arms (not shown) at each cylindrical end 9a of drum 9. The inner drum 9 is provided with a strip 10 which is wound in an helicoidal manner around its longitudinal axis like a screw thread and with radial walls 11 which extend in a parallel direction with the longitudinal axis of the inner drum while being angularly spaced in an equidistant manner from one another so as to delimit, with the turns of the helicoidal strip 10, compartments 12 for receiving and transporting the treated French beans. The strip 10 and the walls 11 are secured to drum 9 for example by welding.

Figure 4:
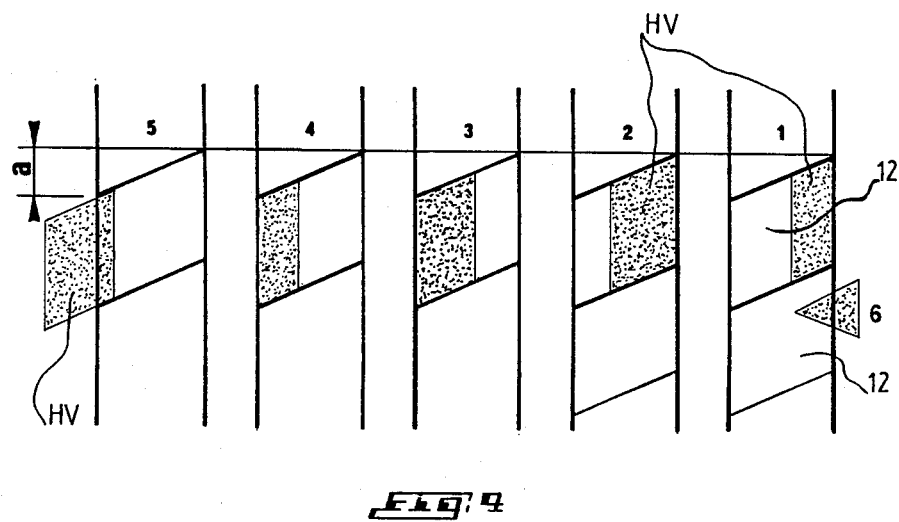
FIG. 4 is a view developed along arrow IV of FIG. 3.

FIG. 3 shows explicitly how the French beans HV are received and transported by a compartment 12 of the inner drum 9. When the French beans are brought to the vicinity of the top of drum 3 due to the rotation thereof along arrow R, they fall into the compartment 12 which thus stops the fall of the French beans after a relatively short initial height of fall h. The French beans are then transported positively inside the compartment 12 along an approximately helicoidal path so as to make the French beans go down and also to move them along the axial direction with respect to the inner drum 9 down to a lower level located at a relatively low height h' above the present bottom of drum 3 and to make them fall once more down to this bottom. FIG. 4 shows the axial displacement pitch a of the French beans inside compartment 12 during the rotation of the drum, the French beans being in addition caused to slidingly move in a body along the convex bottom-forming wall 12a of compartment 12. The French beans are then brought once more to the vicinity of the top of drum 3 and fall into a compartment 12 located downstream of the abovementioned first compartment and the French beans are once more positively transported along the helicoidal path so as to produce their longitudinal progression of a new pitch a inside drum 3 in a parallel direction to the longitudinal axis X-X' thereof. It is to be noted that, by using the inner drum 9, the axis X-X', instead of being inclined with respect to an horizontal line, may also be substantially horizontal since the specific structure of the inner drum 9 will always permit the longitudinal progression of the produce inside drum 3.

Therefore, it is understood that the presence of the inner drum 9 according to the invention permits lowering the effective height of fall of the produce inside drum 3 to lower their impact speed while producing the longitudinal progression of the produce inside drum 3 in a parallel direction to the longitudinal axis thereof.

Figure 2:
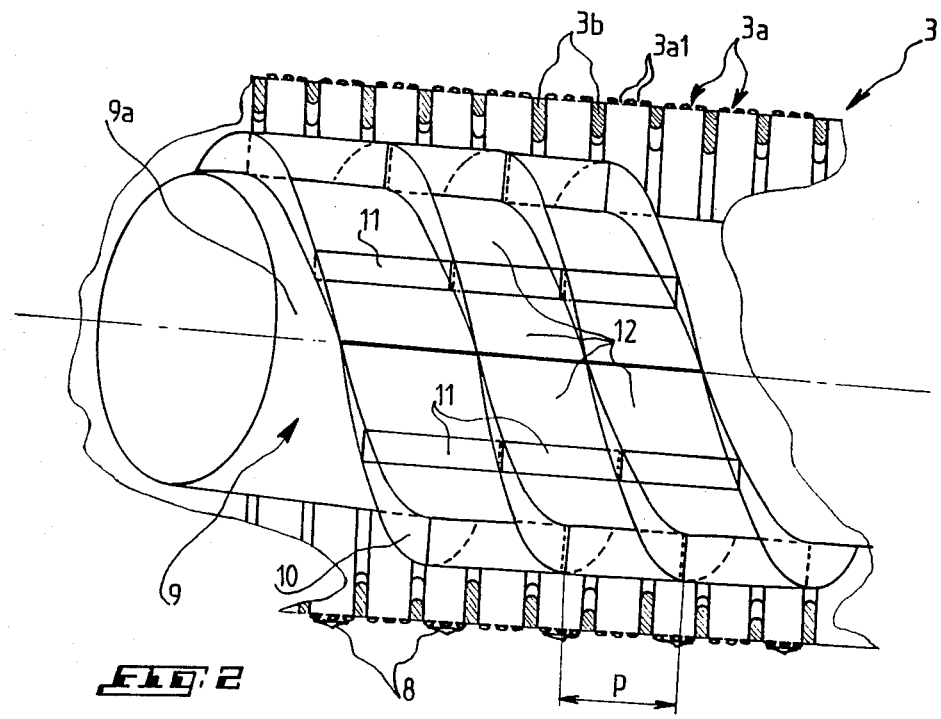
FIG. 2 is a partial cross-sectional view along line II—II of FIG. 1, the inner drum of the device of the present invention being shown partly in perspective.

FIG. 2 shows the pitch p as being approximately equal to twice the width of a plaquette 3a but this pitch may of course be different and may for example be equal to the width of a plaquette 3a.

Moreover, the turns of the helicoidal strip 10 may have a selectively varying pitch.

Besides, the inner drum 9, instead of being used in a machine for cutting off the ends of vegetables as above, may also be mounted inside a treatment drum of a French bean sorting machine to solve a problem identical to that described with reference to the machine for cutting off the ends of French beans.

Finally, instead of being solid with the treatment drum 3, the drum 9 may be mounted so as to provide a relative rotation movement between drum 9 and drum 3.

What is claimed is:

1. A method for sorting or cutting off the ends of elongated agricultural produce, occurring near a surface of an inner lateral wall of a rotary drum that has a longitudinal axis, wherein said produce is continually brought to a top of the drum due to the rotation thereof, and then falls towards a bottom of the drum, comprising the steps of
    stopping the fall of the produce, after a relatively short initial falling distance, at a point intermediate of the top and the bottom of the drum, thus lowering the effective falling distance of the produce to reduce an impact speed thereof;
    receiving the produce and transporting it along an approximately helicoidal path in order not only to move the produce toward the bottom of the drum to a lower level located at a relatively low height above the bottom of the drum but also to move it in a direction parallel to the longitudinal axis of the drum; and
    making the produce fall once more down to the bottom of the drum from said lower level.

2. A method according to claim 1, wherein said longitudinal axis of said rotary drum is substantially horizontal.

3. A method according to claim 1, wherein said longitudinal axis of said rotary drum is inclined with respect to a horizontal line.

4. A method according to claim 1, wherein said agricultural produce comprises vegetables.

5. A method for the treatment of French beans, in a machine for cutting off the ends of said French beans at a position near a surface of an inner lateral wall of a rotary drum having a longitudinal axis, wherein the French beans are continually brought to a top of the drum due to the rotation thereof and then fall towards a bottom of the drum, comprising the steps of:
    stopping the fall of the French beans after a relatively short initial falling distance at a point intermediate of the top and bottom of the drum, thus lowering the effective falling distance of the French beans to reduce an impact speed thereof;
    receiving the French beans and transporting them positively along an approximately helicoidal path in order not only to move the French beans toward the bottom of the drum to a lower level located at a relatively low height above the bottom of the drum but also to move them in a direction parallel to the longitudinal axis of the drum; and
    making the French beans fall once more down to the bottom of the drum from said lower level.

6. A method for the treatment of French beans, in a machine for sorting them at a position near the surface of an inner lateral wall of a rotary drum having a longitudinal axis, wherein the French beans are continually brought to a top of the drum due to the rotation thereof then fall towards a bottom of the drum, comprising the steps of:
    stopping the fall of the French beans after a relatively short initial falling distance at a position intermediate of the top and the bottom of the drum, thus lowering the effective falling distance of the French beans to reduce an impact speed thereof;

receiving the French beans and transporting them positively along an approximately helicoidal path in order not only to make the French beans move toward the bottom of the drum to a lower level located at a relatively low height above the bottom of the drum but also to move them in a direction parallel to the longitudinal axis of the drum; and making the French beans fall once more down to the bottom of the drum from said lower level.

* * * * *